United States Patent [19]

Doelves

[11] Patent Number: 4,737,700
[45] Date of Patent: Apr. 12, 1988

[54] METHOD AND CIRCUIT FOR DRIVING A STEPPING MOTOR

[75] Inventor: Juergen Doelves, Heikendorf, Fed. Rep. of Germany

[73] Assignee: Dr. Ing. Rudolf Hell GmbH, Fed. Rep. of Germany

[21] Appl. No.: 939,179

[22] Filed: Dec. 8, 1986

[30] Foreign Application Priority Data

Dec. 21, 1985 [EP] European Pat. Off. ........ 85116441.8

[51] Int. Cl.⁴ .............................................. H02P 8/00
[52] U.S. Cl. .................................... 318/696; 318/685; 307/271
[58] Field of Search ................ 318/696, 685; 307/271

[56] References Cited

U.S. PATENT DOCUMENTS

| | | | |
|---|---|---|---|
| 4,084,246 | 4/1978 | Schwartz | 364/510 |
| 4,234,830 | 11/1980 | Cannon | 318/39 |
| 4,241,301 | 12/1980 | Pohlig | 318/696 |
| 4,271,384 | 6/1981 | Beling et al. | 318/685 |
| 4,555,653 | 11/1985 | Nawata et al. | 318/696 |

FOREIGN PATENT DOCUMENTS 2238613 2/1974 Fed. Rep. of Germany.
2420285 12/1977 Fed. Rep. of Germany.

OTHER PUBLICATIONS

Electronik Vo. 31, No. 16, Aug. 1982, pp. 35–38, Munich, W. Kuntz, "Mehrachsige, schnelle Schrittmotorsteuerung min beliebigem Frequencz-Zeit-Profil".

Primary Examiner—William M. Shoop, Jr.
Assistant Examiner—Saul M. Bergmann
Attorney, Agent, or Firm—Hill, Van Santen, Steadman & Simpson

[57] ABSTRACT

A method and circuit for driving a stepping motor which is driven by a motor clock output having a time variable frequency. So as to generate the time varying frequency, the constant frequency of a basic clock output is divided by constant first factor and is multiplied by a time variable second factor which is in the range between zero and the first factor. A transfer clock sequence is derived from the basic clock output by a division factor. The second factor is changed by a prescribed increment with the frequency of the transfer clock output at the respective clock times and this prescribed increment determines the frequency change of the motor clock output per clock interval. In this manner, the unavoidable frequency discontinuities can be maintained small and constant over the full frequency range of the motor clock output even by when the frequency of the basic clock output is not high whereby a reliable run-up and a reliable braking of the stepping motor are assured without stepping errors.

15 Claims, 3 Drawing Sheets

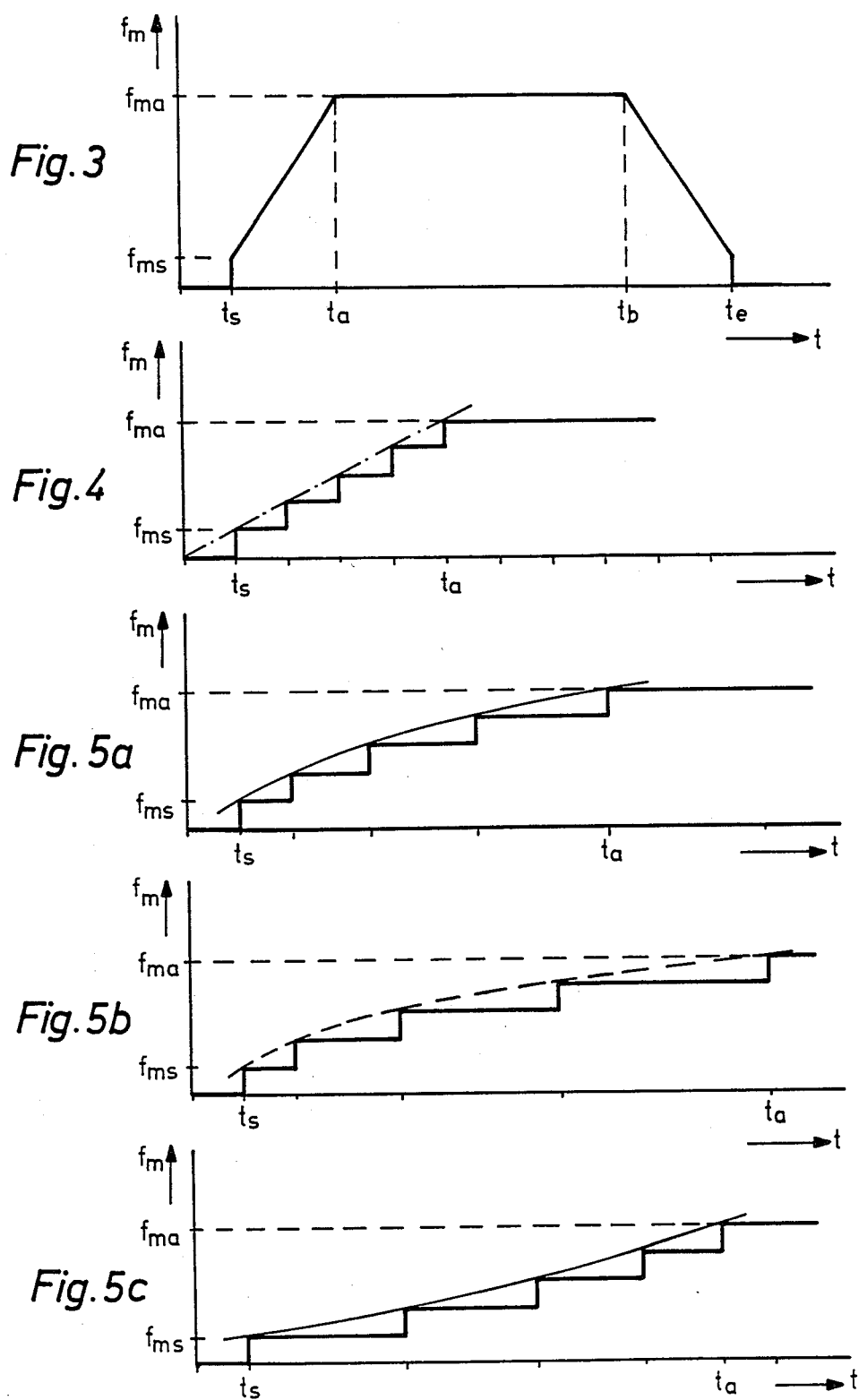

METHOD AND CIRCUIT FOR DRIVING A STEPPING MOTOR

BACKGROUND OF THE INVENTION

1. Field of the Invention

This invention relates in general to drive and control technology for stepping motors and particularly relates to generating a motor clock output with a variable frequency for driving stepping motors during individual operating phases.

2. Description of the Prior Art

Circuit arrangements for driving stepping motors usually comprise a clock generator, a control stage and a motor amplifier. The clock generator generates the motor clock output with the desired motor frequency. Switching pulses cyclically following one another with the motor frequency are derived in the control stage from the motor clock's output. The motor amplifier comprises a DC voltage source and switches controlled by the switching pulses and these switches are connected to the DC voltage source and to the stator windings of the stepping motor. As a result of the cyclical supplying by the switches of the motor frequency, the rotary field for the rotor of the stepping motor is generated and the speed of stepping is dependent on the motor frequency.

A stepping motor has a limiting frequency dependent upon the coupled load at which it no longer starts up without stepping errors on the basis of merely switching the motor clock input on and in which it no longer comes to a standstill with step precision by switching the motor clock output off. So as to avoid stepping errors particularly at high stepping frequencies, the stepping motor in a run-up phase having a rising motor frequency is thereby pulled up to the desired operating frequency from a low starting frequency and is subsequently stopped with step precision in a following deceleration phase by lowering the motor frequency.

The clock generator must therefore supply a motor clock output which has a frequency chronologically variable during run-up and during the decelerating phases and is constant in the work phase. So as to generate a motor clock sequence with a chronologically variable frequency a traditional clock generator is formed with, for example, frequency voltage transformers wherein the chronological frequency curve is dependent on a control voltage. The employment of frequency-to-voltage transformers, however, has the disadvantage in that the curve of the control voltage must be simulated by timing elements, for example, by charging and discharging capacitors and these are used especially when different frequency curves must be available. It is also relatively difficult to hold the control voltage constant during the work phase and to synchronize it with other control parameters during the run-up and decelerating phases.

Another type of apparatus for generating a motor clock output with a variable motor frequency is disclosed in German A No. 22 38 613 wherein the clock generator is composed of a clock generator that generates a basic clock output having a constant basic frequency and also includes a following frequency divider stage constructed of individual flipflops in which the required motor frequency is acquired from the basic frequency of the basic clock output by frequency division. The variable motor frequency is generated by means of chronologically varying the division factor for example with the assistance of timing elements.

German C No. 27 21 240 discloses another clock generator comprising a clock generator and frequency divider stage. The required division factors are prescribed therein as data words which are deposited in a read-only memory as a program sequence and are output dependent on the executed steps of the stepping motor in order to operate the stepping motor with optimum load angle.

In the known clock generators having traditionally constructed frequency divider stages, disturbing frequency discontinuities occur during step-by-step switching of the frequency divider stages and these discontinuities are especially great and disturbing when small division factors are used. There is a risk that the stepping motor will make step errors or even fall out of step as a consequence of these frequency discontinuities.

However, small division factors always occur when high motor frequencies approaching the constant basic frequency are required. Also, the torque of the stepping motor decreases with increasing motor frequency whereby the risk of step errors or of falling out of step increases when frequency discontinuities occur. For this reason, the division factors for the highest motor frequency should be as large as possible so that the disturbing frequency discontinuities remain small. In order to meet this requirement, a basic clock sequence having an extremely high basic frequency must be generated and this is realizable only with high technology devices.

SUMMARY OF THE INVENTION

It is an object of the present invention to provide a method and circuit arrangement for driving a stepping motor in which fundamentally unavoidable frequency discontinuities can be kept small over the full frequency range of the motor clock output even for not high basic frequencies and with which a reliable run-up and a reliable deceleration of the stepping motor without step errors is assured.

It is a feature of the present invention to provide a method for driving a stepping motor by a motor clock output having a time variable frequency which is obtained by dividing the constant frequency of a basic clock output using a time variable factor wherein for generating the time variable frequency, the frequency of the basic clock output is divided by a constant first factor and is multiplied by a time variable second factor and a transfer clock output is derived from the basic clock output by dividing the frequency of the basic clock output by a division factor and said second factor has the frequency of the transfer clock output and is respectively varied by a prescribed increment.

Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure and in which:

BRIEF DESCRIPTION OF THE DRAWINGS

FIG. 3 is a plot of the curve of the motor frequency in the individual operating phases of the stepping motor;
FIG. 4 is a plot of a frequency ramp;
FIG. 5a is a plot of another frequency ramp;
FIG. 5b is a plot of yet another frequency ramp; and
FIG. 5c illustrates another frequency ramp.

DESCRIPTION OF THE PREFERRED EMBODIMENTS

Figure 1:
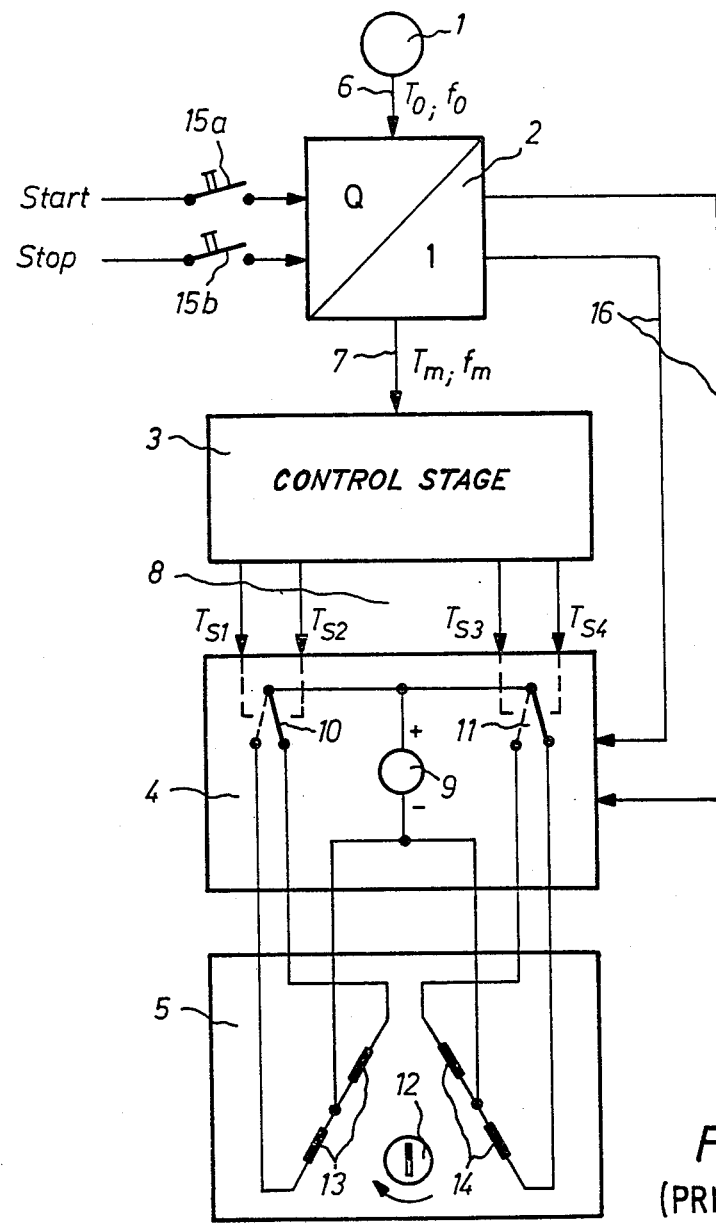
FIG. 1 is a block diagram of a drive circuit for a stepping motor of the prior art.

FIG. 1 is a block schematic diagram of the driving arrangement of a stepping motor according to the prior art. A clock generator 1 produces a clock output and supplies it to lead 6 which is connected to a frequency reduction stage 2. The output of the frequency reduction stage is supplied on lead 7 to a motor control stage 3 and the output of the motor control stage is connected to a motor amplifier 4 which is connected to the stepping motor 5.

The clock generator 1 produces a basic clock output $T_0$ having a constant basic frequency of $f_0$ which is supplied to the frequency reduction stage through the line 6. In the frequency reduction stage 2, a motor clock output $T_m$ having a motor frequency $f_m$ is supplied to the motor control stage 3 by way of line 7 and has been formed from the basic clock output $T_0$ with the constant basic frequency $f_0$ by frequency division. By using ring counter cyclically successive switch pulses $T_{s1}$ through $T_{s4}$ are supplied to the motor amplifier 4 through lines 8 and these are obtained from the motor clock output $T_m$ having the motor frequency $f_m$ and are generated in the motor control stage 3. The motor amplifier 4 is composed of a connectible and disconnectible DC voltage source 9 for generating the motor currents and also includes electronic switches 10 and 11 which are actuated by the switch pulses $T_{s1}$ through $T_{s4}$. The stepping motor 5 has a rotor 12 and a stator which has at its circumference stator windings 13 and 14. The rotor 12 is composed of permanent magnets which are fashioned so as to form pole pairs. The switches 10 and 11 are connected to the DC voltage source 9 as well as to the stator windings 13 and 14 of the stepping motor 5. The switches 10 and 11 are switched by the switch pulses $T_{s1}$ through $T_{s4}$ and are cyclically switched at the motor frequency $f_m$ so as to generate the rotary field for the rotor 12. The speed of the rotor 12 or of the stepping motor 5 is therefore dependent on the motor frequency $f_m$ as well as on the number of pole pairs of the stepping motor 5.

A pair of keys 15a and 15b is connected to the frequency reduction stage 2 and an operator can by using the keys forward a start command to the frequency reduction stage 2 at the beginning of the run-up phase of the stepping motor 5 and can also supply a stop command at the beginning of the braking phase. Corresponding control commands are generated in the frequency reduction stage 2 and these control commands are supplied to the motor amplifier 4 by way of lines 16 and correspondingly switch the DC voltage source 9 on and off, although this is not shown in greater detail since such structure is well known to those skilled in the art.

For a more detailed structure and the manner of functioning of motor control stage 3, motor amplifier 4 and stepping motor 5 reference may be made to the article "Positionierungen fur Schrittmotoren" appearing in the periodical "Elektronik", Vol. 55, No. 7 of Apr. 5, 1973, pages 18–22 and these components are well known to those skilled in the art.

The subject matter of the invention relates to generating of a motor clock output $T_m$ having a time dependent motor frequency $f_m$ (t), also referred to as a frequency ramp for the control of the stepping motor 5 in the individual operating phases. For this purpose, a rising motor frequency is required during the run-up phase, a constant motor frequency is required during the work phase and a descending motor frequency is required during the braking phase.

The motor clock sequence $T_m$ having the time dependent motor frequency $f_m$(t) is produced in the frequency reduction stage 2.

Figure 2:
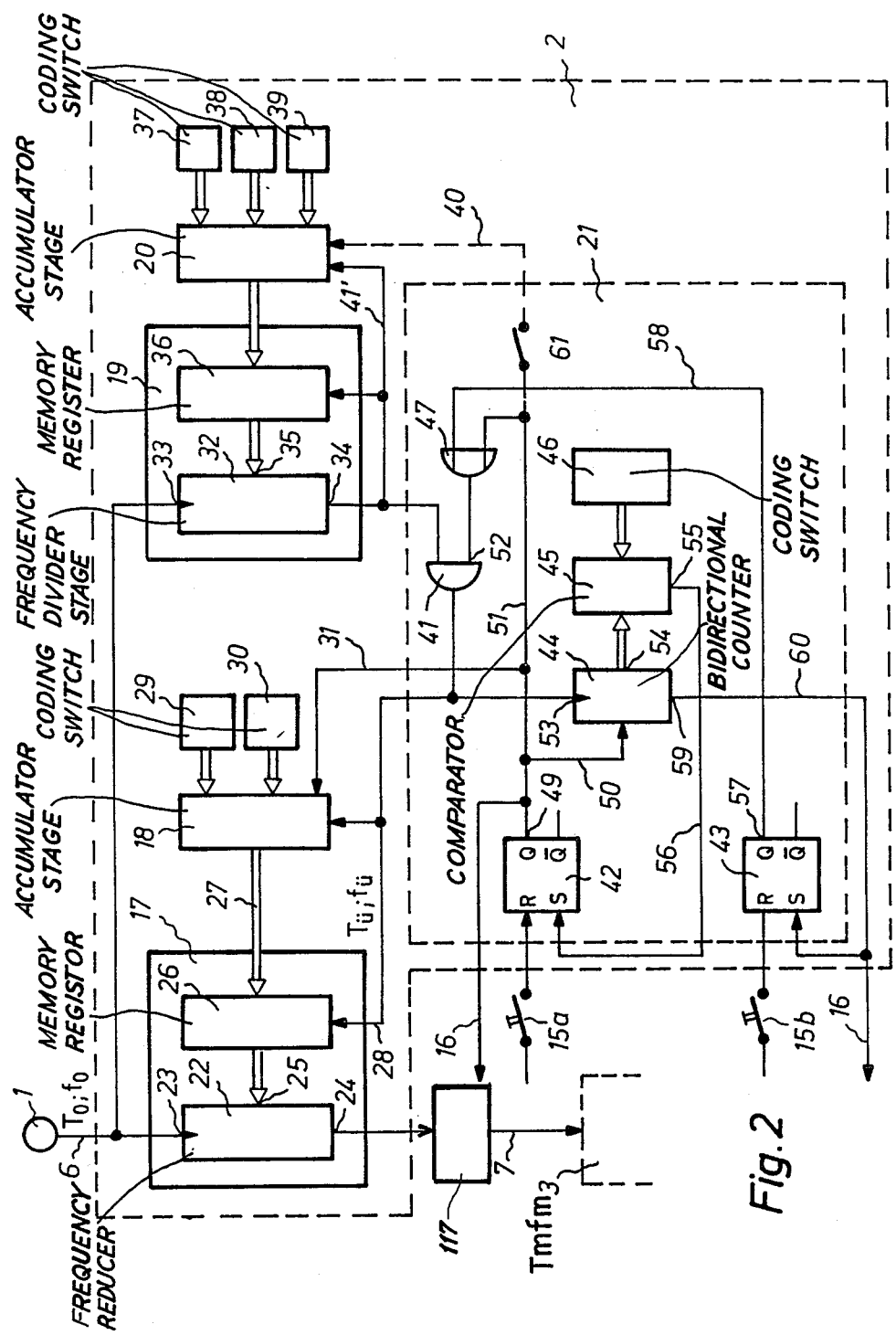
FIG. 2 is a block diagram of a frequency reduction stage according to the invention.

FIG. 2 shows the structure of the frequency reduction stage 2 of the invention and which is connected in the circuit of FIG. 1. The frequency reduction stage 2 comprises a main frequency divider stage 17 which is connected to an accumulator stage 18 and also includes an auxiliary frequency divider stage 19 and a further accumulator stage 20 as well as a control stage 21.

The main frequency divider stage 17 is composed of a frequency reducer 22 which receives an input 23 from the clock generator 6 and produces the output $T_{mi}$ at a frequency of $f_m$ on the lead 7 which is connected to the motor control stage 3. A programming input 25 is supplied to the frequency reducer 22 from a memory register 26.

The frequency reducer 22 is constructed according to the invention such that the output frequency $f_{out}$ supplied to the output 24 is formed by multiplication of the input frequency $f_{in}$ supplied to the input 23 by a multiplication factor $q_m$ according to equation 1.

$$f_{out} = f_{in} \cdot q_m \tag{1}$$

The multiplication factor $q_m$ is stored in the memory register 26 and is supplied to the programming input 25 of the frequency reducer 22 through a data bus. The frequency reducer 22 preferably comprises a six-bit binary rate multiplier of the types SN7497 available from Texas Instruments Company. All of the modules are commercially available and are known to a person skilled in the art so a detailed description of their structure and function is not required.

The module type SN7497 additionally has an internal constant division factor $q_k$, so that the relationship of equation (2) is valid between the output frequency $f_{out}$, and the input frequency $f_{in}$, and the internal division factor $q_k$ and the multiplication factor $q_m$ whereby $0 \leq q_m \leq q_k$.

$$f_{out} = f_{in}(q_m/q_k) \tag{2}$$

The multiplication factor $q_m$ is prescribable as a 6-bit word, so that the multiplication factors from 0 to 63 can be realized with a module. So as to obtain greater multiplication factors, a corresponding plurality of such modules are connected in cascade. Of course, the frequency reducer 22 can also be comprised of individual commercially available component parts.

The basic clock output $T_0$ having the basic frequency $f_0$ is supplied to the input 23 of the frequency reducer 22 from the clock generator 1 through the line 6 and the motor clock output $T_m$ having a motor frequency $f_m$ occurs at the output 24 which is supplied by line 7 to the motor control stage 3 as shown.

The frequency level at which the frequency division occurs in the frequency reducer 22 between the basic frequency $f_0$ and the motor frequency $f_m$ can be freely selected and can thus be adapted to the requirements in that additional frequency dividers 117 are connected between the clock generator 1 and the frequency reduction stage 2 and/or between frequency reduction stage 2 and the motor control stage 3.

With $f_{in}=f_0$, $f_{out}=f_m(t)$ and with $q_m$ as a time-dependent multiplication factor $q_m(t)$, the equation (3) is obtained:

$$f_m(t) = (f_0/q_k) \cdot q_m(t) \tag{3}$$

and with $f_0/q_k = f'_0$, $$f_m(t) = f'_0 q_m(t) \tag{4}$$

According to equation (4), the motor frequency $f_m(t)$ is directly proportional to the multiplication factors $q_m(t)$, so the rising multiplication factor $q_m(t)$ must be used during the run-up phase and a constant multiplication factor $q_{ma}$ corresponding to the work motor frequency must be utilized during the work phase and a descending multiplication factor $q_m$ must be utilized during the braking phase.

The corresponding multiplication factors $q_m(t)$ are generated in the accumulator stage 18 and are transferred into the memory register 26 of the main frequency divider stage 17 with a data bus 27 and are respectively transferred with clock pulses n of a transfer clock sequent $T_{\ddot{u}}$ of the transfer frequency $f_{\ddot{u}}$. The transfer clock sequence $T_{\ddot{u}}$ is supplied to the memory register 26 and to the accumulator stage 18 for synchronization purposes through a line 28.

The clock times $t_n$ of the transfer clock sequence $T_{\ddot{u}}$ thus determine the time at which the multiplication factor $q_m(t)$ and, thus, the motor frequency $f_m(t)$ changes.

The multiplication factors $q_m(t)$ are formed in the individual operating phases of the stepping motor according to Equation 5.

In the run-up phase: $q_m(t) = q_{m0} + n \cdot \Delta q_m$ (5a)

In the work phase: $q_m(t) = q_m = \text{const.}$ (5b)

In the braking phase: $q_m(t) = q_{ma} - n \cdot \Delta q_m$ (5c)

In equation 5, "$q_{mo}$" is a prescribable constant part which as shall be later shown determines the starting motor frequency $f_{mo}$ during the run-up phase and "$n\Delta q_m$" is a part dependent on time. "$\Delta q_m$" represents a prescribable change amount of the multiplication factor $q_m(t)$ in the time interval $\Delta_t$ between two successive clock pulses n of the transfer clock sequence $T_u$ which as shall be later shown defines the slope of the frequency ramp $f_m(t)$. The parameters "$q_{mo}$" and "$\Delta q_m$" are digitally input into the accumulator stage 18 by coding switches 29 and 30 while the accumulator stage 18 is switched over with a control line 31 to addition (Equation 5a) or subtraction (Equation 5c). A computer can also replace the coding switches 29 and 30 for the manual input of the parameters and this computer will calculate the required parameters based on the required operating conditions for the stepping motor 5.

The transfer clock sequence $T_{\ddot{u}}$ is obtained from the basic clock output $T_0$ in the auxiliary frequency reduction stage 19 and is derived by means of a traditional frequency division with the division factor $q_{\ddot{u}}$.

The auxiliary frequency reduction stage 19 comprises a normal frequency divider 32 which may be, for example a type SN7493 and has an input 33 connected to the output of the clock 1 and produces an output 34 and receives a programming input 35 for the division factor $q_{\ddot{u}}$ from a memory register 36 which may be a type SN74174 and which is connected to the programming input 35.

The basic clock output $T_0$ is supplied to the input 33 of the frequency divider 32 from line 6 and the transfer clock output $T_{\ddot{u}}$ having the transfer frequency $f_{\ddot{u}}$ occurs at the output 34 of frequency divider 32 wherein the relationship of Equation 6 applies.

$$f_{\ddot{u}} = (f_0/q_{\ddot{u}}) \tag{6}$$

The transfer frequency $f_{\ddot{u}}$ can be generated and maintained constant where $q_{\ddot{u}}$=constant or can be generated so as to ascend or descend as a function of time where $q_{\ddot{u}}$ is time-dependent so as shall be shown hereafter to generate different curves for the frequency ramp $f_m(t)$.

The division factors $q_{\ddot{u}}$ are formed in the accumulator stage 20 according to Equation 7.

For a time-dependent transfer frequency:

$$q_{\ddot{u}}(t) = q_{\ddot{u}_0} \pm n \Delta q_u \tag{7a}$$

For a constant transfer frequency:

$$q_{\ddot{u}} = q_{\ddot{u}_o} = \text{const.} \tag{7b}$$

The values "$q_{\ddot{u}_0}$" and "$\Delta_q u$" are supplied to the accumulator stage 20 from coding switches 37 and 38 and the instruction for addition or for subtraction is input into the accumulator stage from a further coding switch 39. However, the accumulator stage 18 can also be switched from addition to subtraction or vice versa by corresponding control instructions from the control stage 21 through a control line 40 shown in dashed line in FIG. 2.

The accumulator stage 20 is synchronized with the transfer clock output $T_{\ddot{u}}$ by a line 41'. The division factors $q_{\ddot{u}}(t)$ generated in the accumulator stage 20 are transferred into the memory register 36 and are respectively transferred by the clock of the transfer clock pulses $T_{\ddot{u}}$ supplied on line 41'. In case a constant division factor $q_{\ddot{u}}$ and, thus, a constant transfer frequency $f_{\ddot{u}}$ are to be generated, the accumulator stage is stopped. The accumulator stages 18 and 20 are preferably constructed of modules which may be type SN545482.

The following relationships for the operating phases of the stepping motor 5 between the motor frequency $f_m(t)$, the multiplication factor $q_m(t)$ and the transfer frequency $f_{\ddot{u}}$ or respectively, the division factor $q_{\ddot{u}}$ are obtained whereby a distinction is made between a constant $q_{\ddot{u}}$ and a time dependent $q_{\ddot{u}}(t)$.

For that purpose, FIG. 3 illustrates the typical curve of the motor frequency $f_m(t)$ in the individual operation phases of the stepping motor 5 whereby a linear frequency change or frequency ramp is assumed. At time $t_s$, the start instruction for run-up of the stepping motor 5 is shown. The run-up phase is identified by the time interval $t_s$ through $t_a$ in which the motor frequency $f_m$ linearly rises up to the working frequency $f_{ma}$ which corresponds to the desired speed of the stepping motor 5. In the working phase of the stepping motor during the time interval $t_a$ through $t_b$ the working frequency $f_{ma}$ remains constant. At time $t_b$, the stop instruction is given. This is followed by the braking phase during the time interval $t_b$ through $t_e$ during which the stepping motor is decelerated by a linearly descending motor frequency $f_m$ down to stop at point $t_e$.

Run-up Phase $t_s$ through $t_a$

In the run-up phase, the multiplication factor $q_m(t)$ according to Equation 5a occurs at the individual clock time $t_n$ of the transfer clock sequence $T_{\ddot{u}}$ as follows:

$$
\begin{aligned}
&\text{At time } t_0 & q_{m0} &= q_{m0} \\
&\text{At time } t_1 & q_{m1} &= q_{m0} + \Delta q_m \\
&\text{At time } t_2 & q_{m2} &= q_{m0} + 2\Delta q_m = q_{m1} + \Delta q_m \\
&\text{At time } t_n & q_{mn} &= q_{m0} + n\Delta q_m = q_{m(n-1)} + \Delta q_m
\end{aligned} \quad (8)
$$

According to Equation 3, the motor frequency $f_{mn}$ is generally:

$$f_{mn} = f_0(q_{m0} + n\Delta q_m) \qquad (9)$$

The starting motor frequency $f_{ms}$ at time $t_s = t_o$ of the beginning of run-up is derived from Equation 4:

$$f_{ms} = f_0 \cdot q_{m0} \qquad (10)$$

The starting motor frequency $f_{ms}$ can thus be prescribed by the term "$q_{m0}$" which is set by the coding switch 29.

At time $t_a$ of the end of run-up, the motor frequency is then equal to the working motor frequency $f_{ma}$:

$$f_{ma} = f_0 q_{ma} \text{ with } q_{ma} = q_{mo} + n\Delta q_m \qquad (11)$$

The curve of the motor frequency $f_m(t)$ between the starting motor frequency $f_{ms}$ and the working motor frequency $f_{ma}$ can be linear or curved.

Case (a) Linear Frequency Ramp $f_m(t)$

The division factor $q_{\ddot{u}} = q_{\ddot{u}}$ is constant ($n\Delta q_{\ddot{u}} = 0$) and, thus so is the transfer frequency $f_{\ddot{u}}$. The clock pulses of the transfer clock output $T_{\ddot{u}}$ are equidistant ($\Delta t =$ constant).

The frequency change $f_m$ between two clocks of the transfer clock output $T_{\ddot{u}}$ during the time interval $\Delta t$ is then:

$$\Delta f_m = f_0 \Delta q_m = \text{constant} \qquad (12)$$

and the slope S or, respectively, the gradient of the frequency change is:

$$S = \frac{\Delta f_m}{\Delta t} = \frac{\Delta q_m f_0}{\Delta t} = \text{const.} \qquad (13)$$

With a constant division factor $q_{\ddot{u}}$ for the transfer clock sequence $T_{\ddot{u}}$, thus, a motor frequency $f_m$ rising linearly with time is generated whereby the steepness S according to Equation 13 is prescribed by the quantity "$\Delta q_m$" which can be set with the coding switch 30 and/or by variation of the time interval $\Delta t$ with the assitance of the division factor $q_{\ddot{u}}$.

FIG. 4 is a graphic illustration of the linearly ascending curve of the motor frequency $f_m$ (linear frequency ramp) during the run-up phase from the starting time $t_s$ up to the time $t_a$ at which the work phase begins.

Case (b) Curved Frequency Ramp $f_m(t)$

According to Equation 4, the division fact $q_u$ is time-dependent ($n\Delta q_{\ddot{u}} \neq 0$) and, thus, so is the transfer frequency $f_{\ddot{u}}$.

The clock pulses of the transfer clock output $T_{\ddot{u}}$ are no longer equidistant.

In this case, the time difference $\Delta t$ between two clock pulses of the transfer clock output $T_{\ddot{u}}$ and the steepness $S_n$ of the motor frequency change are no longer constant but change with time according to Equation 14 and 15.

$$\Delta t = q_{\ddot{u}0} + (n - 1)\Delta q_{\ddot{u}} \qquad (14)$$

$$S_n = \frac{f_0^2 \Delta q_m}{q_{u0} \pm (n - 1)\Delta q_{\ddot{u}}} \qquad (15)$$

The deriving from Equation 15, the starting steepness $S_1$ at time $t_1$ and the final steepness $S_{n+1}$ at time $S_{n+1}$:

$$S_1 = \frac{f_0^2 \Delta q_m}{q_{u0}} \qquad (16)$$

$$S_{n+1} = \frac{f_0^2 \Delta q_m}{q_{\ddot{u}0} \pm n\, q_{\ddot{u}}} \qquad (17)$$

With the assistance of a time-dependent division factor $q_{\ddot{u}}(t)$, thus, a curved path of the motor frequency $f_m(t)$ or, respectively, a curve frequency ramp can be achieved whereby the quantity $\Delta q_{\ddot{u}}$ determines the path of the curvature. The curves 5a through 5c show various examples. FIG. 5a shows a curved frequency ramp $f_m(t)$ which has a steepness which decreases slowly due to the selection of a small positive value $\Delta q_{\ddot{u}}$, whereas the steepness of the frequency ramp $f_m(t)$ illustrated in FIG. 5b decreases quickly due to the selection of a large positive value $\Delta q_{\ddot{u}}$.

When by contrast, a negative value $\Delta q_{\ddot{u}}$ is selected, then, according to FIG. 5c a frequency ramp $f_m(t)$ which has a steepness that increases with time is generated.

By means of an expedient selection of the various parameters, the curve of the ramp function $f_m(t)$ can be varied within broad limits in this manner and, thus, can be optimally matched to the properties of the stepping motor and/or of the connected load in an advantageous way.

Work Phase $t_a$ through $t_b$

During the work phase, the working motor frequency $f_{ma}$ reached at the end of the run-up time $t_a$ is held constant up to the beginning of the braking at time $t_b$ by means of a constant multiplication factor $q_{ma}$ according to the equations 4 and 5b.

$$f_{ma} = f_0 \cdot q_{ma} \qquad (18)$$

Braking Phase $t_b$ through $t_e$

Proceeding from the multiplication factor $q_{ma}$, the multiplication factor $q_m(t)$ during the braking phase decreases at the individual clock time $t'_n$ of the transfer clock $T_{\ddot{u}}$ according to Equation 5c in the following manner:

$$
\begin{aligned}
&\text{At time } t'_0 & q_{m0} &= q_{ma} \\
&\text{At time } t'_1 & q_{m1} &= q_{ma} - \Delta q_m \\
&\text{At time } t'_2 & q_{m2} &= q_{ma} - 2\Delta q_m \\
&\text{At time } t'_n & q_{mn} &= q_{ma} - n\Delta q_n \text{ etc.}
\end{aligned} \quad (19)
$$

and the motor frequency $f_m(t)$ then decreases according to Equation 4 until the stepping motor has come to a standstill at time $t_e$.

$$f_{mn} = f_0(q_{ma} - n\Delta q_m) \qquad (20)$$

The generating of the motor clock output $T_m$ with variable motor frequency $f_m$ has been explained and the control of the stepping motor 5 in the individual operating phases by the control stage 21 will now be set forth in greater detail.

The control stage 21 includes an AND gate 41 which is connected to lead 41' and switching flipflops 42 and 43 are provided which are connected to a bidirectional counter 44. The bidirectional counter 44 provides an output on bus 54 which is connected to a comparator 45 which is connected to a coding switch 46 and an OR gate 47 is connected to the AND gate 41 and has input leads 51 and 58.

Before the stepping motor 5 is placed in operation, the required parameters "$q_{m0}$", "$\Delta q_m$", "$q_{u0}$" and "$\Delta q_{\ddot{u}}$" are set at the coding switches 29, 30, 37 and 38 and the corresponding operational sign is set at the coding switch 39 and are input into the accumulator stages 18 and 20. The plurality of clock pulses of the transfer clock output $T_{\ddot{u}}$ required for the run-up of the stepping motor 5 to the working motor frequency $f_{ma}$ is also preset at the coding switch 46 in the control stage 21. The plurality n of clock pulses is given by the quotient of the difference between the working motor frequency $f_{ma}$ and the starting frequency $f_{ms}$ and the set frequency change $\Delta f_m$ per transfer clock whereby $n \cdot \Delta f_m$ is a measure for the motor frequency reached at the present time. During the individual operating phases of the stepping motor 5, the functioning of the control stage 21 is as follows according to the graphic illustration in FIG. 3.

Run-Up Phase

For initiating the run-up, the start key 15a is pressed whereby the Q output 49 of the switching flipflop 42 is set to a H level as the control instruction "Start of Run-Up". This control instruction "Start of Run-Up" triggers various events. Through the control line 31 the accumulator stage 18 is switched to "run-up", in other words, to addition mode according to Equation 5a. Through the control 50, the bidirection counter 44 is switched to forward counting mode by the control instruction. Simultaneously, the control instruction "Start of Run-Up" is forwarded by way of control line 51 and the OR gate 47 to an input 2 of the AND gate 41 so that the AND gate 41 opens and the transfer clock output $T_{\ddot{u}}$ is connected through.

Also, the motor control stage 4 illustrated in FIG. 1 is started by way of the control line 16. The transfer clock sequence $T_{\ddot{u}}$ enabled by the AND gate 41 now controls the transfer of the division factor $q_m$ generated in the accumulator stage according to Equation 5a into the memory register 26 of the main frequency divider stage 17. At the same time, the enable transfer clock output $T_{\ddot{u}}$ is counted into the bidirectional counter 44 through the clock input 53 and is counted there for the identification of the momentarily reached motor frequency $n \cdot \Delta f_m$ after the starting time $t_s$. The current plurality of clock pulses counted into the bidirectional counter 44 is continuously compared to the plurality preset at the coding switch 46 for which purpose the comparator 45 is connected to the data outputs 54 of the bidirectional counter 44 and to the coding switch 46. Given equality at the end of the run-up phase at time $t_b$ at which the working motor frequency $f_{ma}$ is reached, the comparator 45 emits a control instruction "end of run-up" at a signal output 55 which resets the switching flipflop 42 through line 56. The Q output 49 of the switching flipflop 42 assumes the L level and this corresponds to a control instruction "end of run-up". This control instruction "end of run-up" switches the OR gate 47 and the input 52 of the AND gate 41 off through the line 51. As a result, the transfer clock sequence is disconnected and the transfer of new multiplication factors $q_m$ into the memory register 26 is stopped. Thus, the multiplication factor $q_{ma}$ according to Equation 5b is held constant for the duration of the work phase of the stepping motor 5. Due to the disconnect of the transfer clock sequence $T_{\ddot{u}}$ also the counter reading in the bidirectional counter 44 is frozen for the duration of the work phase. The control instruction "end of run-up" and preparation for the braking phase also switches the accumulator stage 18 to the subtraction mode according to Equation 5c through line 31 and switches the bidirectional counter over to backward counting mode through the line 50.

Braking Phase

For the initiation of the braking phase (time $t_b$) the stop key 15b is pressed and the switching flipflop 43 is set. The Q output 57 of the switching flipflop 43 assumes the H level in accord with a control instruction "start of braking". Through a line 58 and the OR gate 47, the control instruction "Start of Braking" proceeds to the switching input 52 of the AND gate 41. The AND gate 41 is switched and the transfer clock sequence $T_{\ddot{u}}$ is again enabled. According to the set subtraction mode, multiplication factors $q_m$ decreasing with time are now generated in the accumulator stage 18 according to Equation 5c and are transferred into the memory register 26. A frequency ramp having a decreasing motor frequency $f_m$ is thereby acquired. Simultaneously, the counter reading in the bidirection counter 44 is also deincremented by the enable transfer clock sequence $T_{\ddot{u}}$ until the counter reading becomes zero at the end of the braking phase at time $t_e$ and the bidirectional counter 44 emits a control instruction "end of braking" at its signal output 59. The control instruction "end of braking" resets the switching flipflop 43 through line 41 whereby the AND gate 41 is turned off. At the same time, the control instruction "end of braking" also switches the motor stage off through line 16.

In most applications, the frequency ramp of the braking phase will be a mirror image of the frequency ramp of the run-up phase, in other words, both frequency ramps will, for example, have a linear curve with the same slope or gradient so that run-up phase and braking phase are of equal length. It is also within the framework of the invention to select different curves for the frequency ramps during the run-up phase and the braking phase. For example, the two frequency ramps can proceed linearly but with different slopes. In this case, respectively, two different parameters "$q_{mo}$" and "$q_m$" are input into the accumulator stage 18 with the use of the coding switches 29 and 30 and switching with the control instruction on the line 31 is correspondingly carried out. It is just as possible however, that one portion of the frequency ramp can be linear and the other portion curved or that the two frequency ramps can have different curvatures for which purposes the parameter set in the accumulator stage 20 with the coding switches 37, 38 and 39 can be switched over with a control instruction on line 40 that can be switced on and off using a switch 61.

It is seen that the invention provides an improved frequency reduction stage for a stepping motor control.

Although the invention has been described with respect to preferred embodiments, it is not to be so limited as changes and modifications can be made which are within the full intended scope of the invention as defined by the appended claims.

I claim as my invention:

1. A method for driving a stepping motor in which run-up, operating and braking states are excited by a motor clock pulse sequence having a time-variable motor frequency which is obtained by dividing the fixed frequency of a basic clock pulse sequence by means of a time-variable quantity, comprising the steps of
   (a) generating a time-variable frequency ($f_m$) by using said constant frequency ($f_0$) of said basic clock pulse sequence ($T_0$) and dividing it by a constant first factor ($q_k$) and multiplying it by a time-variable second factor ($q_m$), where $0 \leq q_m \leq q_k$ applies, said second factor representing said time-variable quantity,
   (b) deriving a transfer clock pulse sequence ($T_ü$) from said basic clock pulse ($T_0$) by dividing said constant frequency ($f_0$) of said basic clock pulse sequence ($T_0$) by a dividing factor ($q_ü$),
   (c) varying said second factor ($q_m$) by prescribed increments ($\Delta q_m$) at clock times of said transfer clock pulse sequence ($T_u$), one prescribed increment determining a frequency change of said time-variable frequency ($f_m$), and
   (d) generating said time-variable motor frequency ($F_m^*$) of said motor clock pulse sequence ($T_m$) by dividing said time-variable frequency ($f_m$) by a constant dividing factor ($q_m^*$).

2. A method according to claim 1, comprising changing said time-variable frequency ($f_m$) of said motor clock sequence ($T_m$) by means of said second factor ($q_m$) by switching on said transfer clock pulse sequence ($T_u$) and ending said changing by switching it off.

3. A method according to claim 1 or 2, comprising,
   (a) selecting a constant part ($q_{m0}$) of said second factor ($q_m$) which determines the starting frequency ($f_{ms}$) of said motor clock pulse sequence ($T_m$) at the beginning of the run-up state of said stepping motor, and
   (b) forming during said run-up state, said second factor ($q_m$) by continuous addition of said increments ($\Delta q_m$) to said constant part ($q_{m0}$) at the clock times of said transfer clock pulse sequence ($T_ü$) in accordance with the relationship $$q_m = q_{m0} + n\Delta q_m$$

whereby "n" is the number of clock pulses of said transfer clock pulse sequence ($T_ü$) occurring since the beginning of said run-up state.

4. A method according to claims 1 or 2, comprising
   (a) interrupting the change of said second factor ($q_m$) at the end of said run-up state; and
   (b) storing the value of said second factor ($q_{ma}$), reached at the end of said run-up state during the operating state of said stepping motor; and said stored value defines the operating frequency of said stepping motor during the operating state.

5. A method according to claims 1 or 2, comprising forming during the braking state of said stepping motor said second factor ($q_m$) by continuous subtraction of said increments ($\Delta q_m$) from the stored value of said second factor ($q_{ma}$) at said clock times of said transfer clock pulse sequence ($t_ü$) in accordance with the relationship $$q_m = q_{ma} - n\Delta q_m$$

whereby "n" is the number of clock pulses of said transfer clock pulse sequence ($T_u$) executed from the beginning of the braking state.

6. A method according to claims 1 or 2, comprising generating said second factor ($q_m$) at a clock time of said transfer clock pulse sequence ($T_ü$) by variation of the second factor ($q_m$) formed at the preceding clock time of said transfer clock pulse sequence ($T_ü$) by said prescribed increment ($\Delta q_m$).

7. A method according to claims 1 or 2, comprising generating a linear frequency change of said time-variable frequency ($f_m$) of said motor clock pulse sequence ($T_m$) during the run-up state and/or braking state by utilizing a constant dividing factor ($q_ü$) or, respectively, a constant frequency ($f_u$) of said transfer clock pulse sequence ($T_ü$).

8. A method according to claim 7, comprising setting the slope of the linear frequency change of said time-variable frequency ($f_m$) of said motor clock pulse sequence ($T_m$) by the value of said constant dividing factor ($q_ü$).

9. A method according to claim 1 or 2, comprising generating a non-linear frequency change of said time-variable frequency ($f_m$) of said motor clock pulse sequence ($T_m$) during the run-up state and/or braking state by varying said dividing factor ($q_ü$) or, respectively, said frequency ($f_ü$) of said transfer clock pulse sequence ($T_ü$) as a function of time.

10. A method according to claims 1 or 2, comprising,
    (a) defining said second factor ($q_{ma}$) which determines a desired operating frequency during the operating state of said stepping motor as a number (n) of clock pulses of said transfer clock pulse sequence ($T_ü$) which are to be executed from the beginning of said run-up state,
    (b) switching on said transfer clock pulse sequence ($T_ü$) at the beginning of said run-up state and counting the number of the clock pulses of said transfer clock pulse sequence ($T_ü$),
    (c) comparing said counted number of clock pulses and the number of clock pulses representing said defined second factor ($q_{ma}$), and
    (d) interrupting said transfer clock pulse sequence ($T_ü$) when the counted number of clock pulses coincides with the number of clock pulses representing said defined second factor ($q_{ma}$) and fixing said counted number of clock pulses at the end of the run-up state.

11. A method according to claims 1 or 2, comprising
    (a) switching on said transfer clock pulse sequence ($T_ü$) at the start of the braking state,
    (b) deincrementing said counted number of clock pulses by means of the clock pulses of said transfer clock pulse sequence ($T_ü$), and
    (c) ending the braking state of said stepping motor at the clock count of "zero".

12. An arrangement for driving a stepping motor during its run-up, operating and braking states, comprising
    (a) a clock generator (1) for generating a basic clock pulse sequence ($T_0$) having a constant frequency ($f_0$),
    (b) a main frequency divider stage (17) connected to said clock generator (1) for generating a time-variable frequency ($f_m$) by multiplication of the said constant frequency ($f_0$) of said basic clock pulse sequence ($T_0$) by a time-variable factor ($q_m$), (c) a sub-frequency divider stage (17*) connected to said main frequency divider stage (17) for generating a time-variable motor frequency ($f_m$*) of said motor clock pulse sequence ($T_m$) by division of the time-variable frequency ($f_m$) by a constant dividing factor ($q_m$*), (d) a motor stage (3;4) connected to said sub-frequency divider stage (17*) for converting said motor clock pulse sequence ($T_m$) having said time-variable frequency ($f_m$*) into drive signals for said stepping motor, (e) an accumulator stage (18) connected to said main frequency divider stage (17) for the formation of said time-variable factor ($q_m$), (f) an auxiliary frequency divider stage (19) connected to said clock generator (1) for generating a transfer clock pulse sequence ($T_ü$) from said basic clock pulse sequence ($T_0$) by dividing the constant frequency ($f_0$) of said basic clock pulse sequence ($T_0$) by a dividing factor ($q_ü$), (g) a second accumulator stage (20) connected to said auxiliary frequency divider stage (19) for the formation of said dividing factor ($q_ü$), (h) a switching stage (41) for said transfer clock pulse sequence ($T_ü$) which is connected to said auxiliary frequency divider stage (19) and to said main frequency divider stage (17), and (i) a control stage (21) for the formation of the switching signal for said switching stage (41).

13. An arrangement according to claim 12, comprising a plurality of coding switches (29, 30, 37, 38, 39) connected to said accumulator stages (18,20) for prescribing parameters.

14. An arrangement according to claims 12 or 13, wherein said main frequency divider stage (17) comprises a memory register (26) for storing said time-variable factor ($q_m$) and said auxiliary frequency divider stage (19) comprises a memory register (36) for storing said dividing factor ($g_ü$).

15. An arrangement according to claims 12 or 13, wherein said control stage (21) comprises, (a) a bidirectional counter (44) connected to said switching stage (41) for counting the clock pulses of said transfer clock pulse sequence ($T_ü$), (b) a coding switch (46) for prescribing a number of clock pulses of said transfer clock pulse sequence ($T_ü$), and (c) a comparator (45) which is connected to said bidirectional counter (44) and to said coding switch (46).

* * * * *